United States Patent [19]
Homeier

[11] 4,355,993
[45] Oct. 26, 1982

[54] WELDED WIRE LINK ROLLER CHAIN

[75] Inventor: Ronald F. Homeier, Plainfield, Ind.

[73] Assignee: PT Components, Inc., Indianapolis, Ind.

[21] Appl. No.: 129,062

[22] Filed: Mar. 10, 1980

[51] Int. Cl.³ .............................................. F16G 13/07
[52] U.S. Cl. .................................... 474/231; 474/230; 474/234
[58] Field of Search ............... 474/62, 210, 227, 228, 474/229, 230, 231, 234, 226, 220; 59/31, 78, 86, 5; 198/851

[56] References Cited

U.S. PATENT DOCUMENTS

| | | | |
|---|---|---|---|
| 304,325 | 9/1884 | Howe | 474/228 |
| 633,738 | 9/1899 | Sheldrick | 474/228 |
| 2,512,429 | 6/1950 | Jones | 474/230 |
| 2,844,042 | 7/1958 | Mercier | 474/230 |
| 2,983,158 | 5/1961 | Hodlewsky | 474/231 |
| 3,056,309 | 10/1962 | Horste | 59/5 X |
| 3,324,737 | 6/1967 | Ohulak | 474/230 |
| 3,620,094 | 11/1971 | Ivashkov et al. | 474/230 |
| 3,628,392 | 12/1971 | Ivashkov et al. | 474/230 X |
| 3,685,362 | 8/1972 | Usov et al. | 474/230 |
| 3,969,949 | 7/1976 | Ohnishi | 474/230 |
| 4,036,072 | 7/1977 | McKeon et al. | 474/234 X |

FOREIGN PATENT DOCUMENTS

| | | | |
|---|---|---|---|
| 2651523 | 5/1978 | Fed. Rep. of Germany | 198/851 |
| 104635 | 3/1917 | United Kingdom | 474/228 |

Primary Examiner—Allan D. Herrmann
Attorney, Agent, or Firm—Robert A. Brown

[57] ABSTRACT

A roller chain that includes a series of alternately arranged inner and outer link units has side links made of wire. The wire side links of the inner unit are welded to the end portions of roller-carrying bushings, and the side links of the outer units are welded to the end portions of pins which extend through the various bushings. An embodiment is disclosed in which the wire links of the outer link units are welded to short sleeves that are pressed onto the pins. Also, a form of the invention involves an arrangement wherein the wire side links of both the inner and outer units are welded to pins and the pins roll on each other to provide the necessary pivoting action of the chain.

11 Claims, 5 Drawing Figures

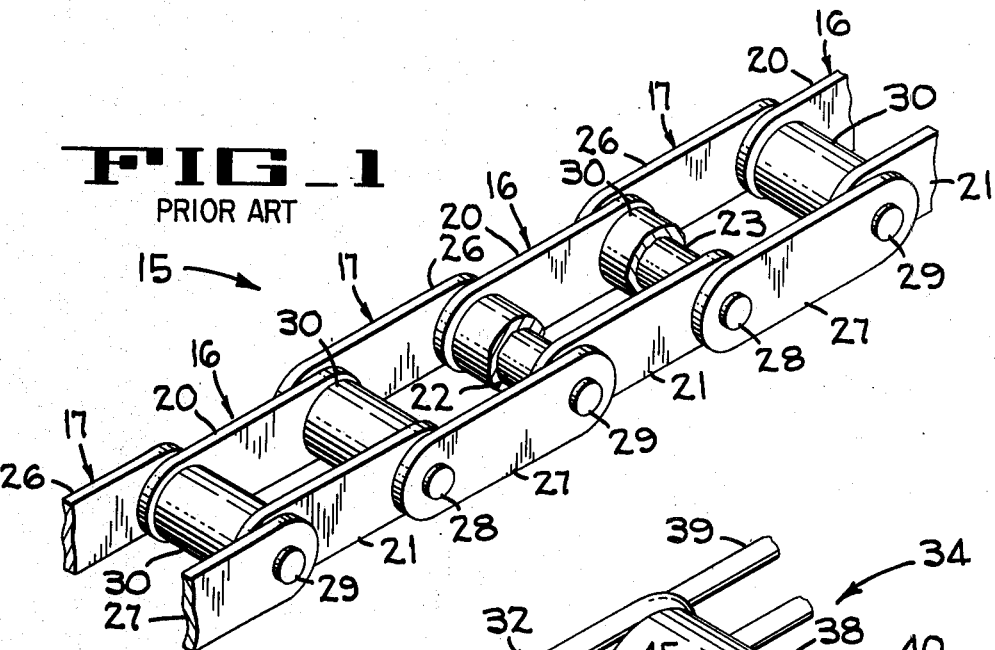
FIG_1 PRIOR ART
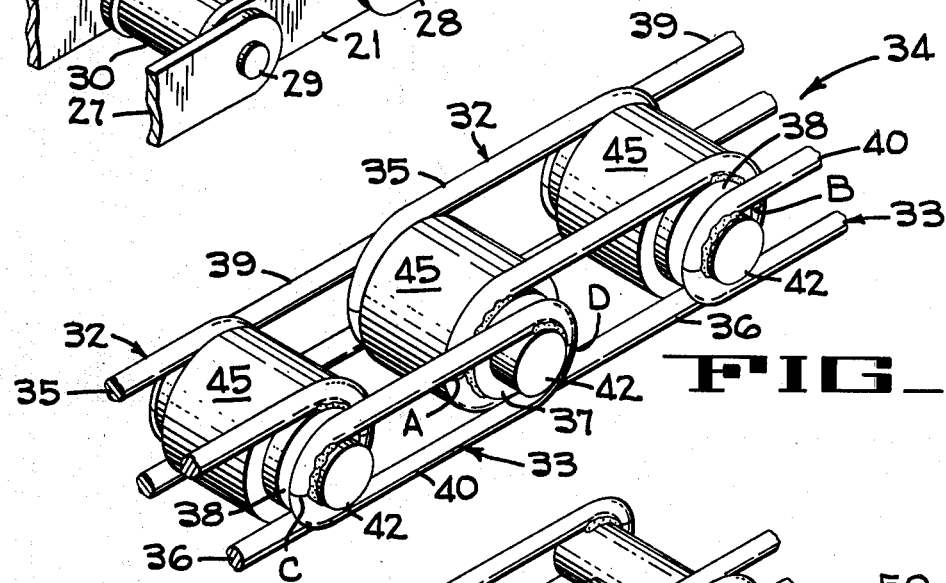
FIG_2
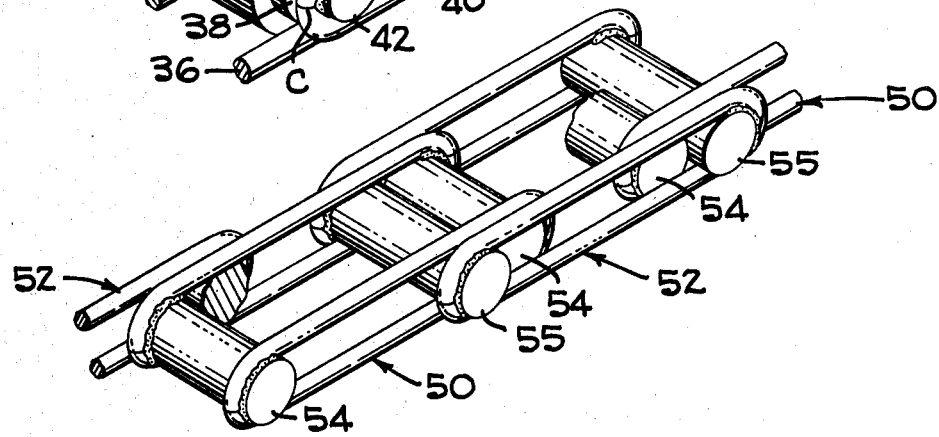
FIG_3

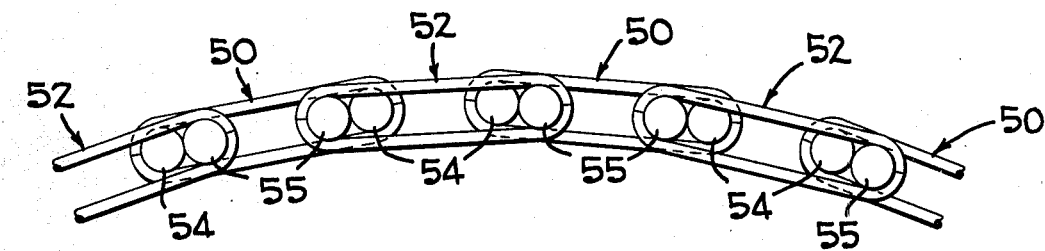
FIG_4
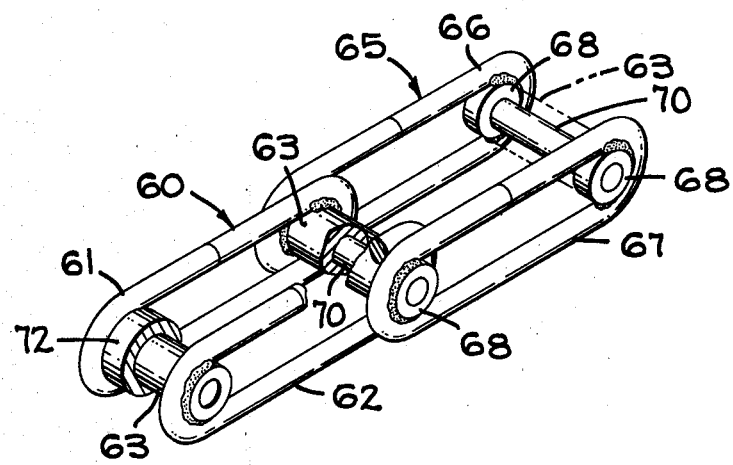
FIG_5

WELDED WIRE LINK ROLLER CHAIN

BACKGROUND OF THE INVENTION

1. Field of the Invention

This invention relates to roller chains of the type that have alternately arranged inner and outer link units pivotally connected by the interaction of transversely-extending pins and bushings. More particularly, this invention concerns a roller chain in which the side links of each link unit are made of wire and are connected to the associated pins and bushings by being welded thereto.

2. Description of the Prior Art

The conventional roller chain of the general type with which this invention is concerned makes use of side links in the form of punched or blanked steel plates such as those shown in U.S. Pat. Nos. 2,568,650 and 2,983,158. These link plates are connected to the bushings and pins in several ways as by press fits, by having the ends of the pins riveted to the plates, by welding or other techniques. U.S. Pat. Nos. 2,983,158 and 3,943,702 disclose press or force fits; U.S. Pat. Nos. 3,583,153 and 3,931,706 discuss riveting; and Patent Nos. 2,159,396, 2,319,979, 2,512,429, 2,844,042, 3,246,347, 3,969,949 and 4,036,072 concern the welding of pins and bushings to side plates. Side links that are not plate-like members are disclosed in U.S. Pat. Nos. 359,029, 372,613, 523,877, 633,738, 1,309,142, 1,899,948 and 3,021,718. These links are generally mounted in pivotal or rotatable relation on the end portions of the transverse chain pins.

SUMMARY OF THE INVENTION

It has been found that there is considerable waste of material in the operation of forming holes in the prior art link plates. The present invention makes use of hot or cold rolled steel wire to form the side links. Not only does the use of wire permit the material to be sized and placed in a location to maximize chain working tension per pound of steel used, but also, hot rolled steel wire is one of the most economical forms in which steel can be obtained for use in manufacturing. While several chains have made use of a welding procedure to secure link plates to bushings and pins, the advantages of welding wire links to the bushing and pins, as is featured in the chain of the present invention, has not been recognized.

It is therefore an object of the present invention to provide a chain in which there is 100% utilization of material from raw material to finished parts, and which is lighter in weight and lower in cost than previous chains having similar operating capabilities.

BRIEF DESCRIPTION OF THE DRAWINGS

FIG. 1 is a perspective of a portion of a prior art chain.

FIG. 2 is a perspective of a portion of a chain constructed according to the teaching of the present invention.

FIG. 3 is a perspective of a portion of a second embodiment of the chain of the present invention.

FIG. 4 is a side elevation showing one operating mode of the chain of FIG. 3.

FIG. 5 is a perspective, with parts shown in section and in phantom, of a portion of a third embodiment of the present invention.

DESCRIPTION OF THE PREFERRED EMBODIMENT

In FIG. 1, the reference numeral 15 indicates generally a section of a conventional roller chain which is made up of a plurality of alternate, interconnected inner bushing link units 16 and outer pin link units 17. Each bushing unit comprises a pair of side plates 20 and 21 held in spaced parallel relation by two tubular bushings 22 and 23, each of which has one of its ends secured in one of the side plates 20 and 21 as by a press fit, and the other end secured in the other plate. Each pin unit 17 comprises two spaced side plates 26 and 27 held in spaced parallel relation by pins 28 and 29 whose ends are pressed into the plates 26 and 27. It is to be noted that each of the pins 28 and 29 passes through one of the bushings 22 or 23. A tubular roller 30 is rotatably positioned over each of the bushings 22 and 23.

In the present invention, shown in FIG. 2, inner bushing link units 32 are interconnected to outer pin units 33 to form a chain 34. Each inner unit comprises two rigid side links 35 and 36 that are held in spaced parallel relation by two tubular bushings 37 and 38 to which the side links are welded. Each outer pin link unit 33 comprises two rigid side links 39 and 40 held in spaced parallel relation by two pins 42 to which the side links are welded. Each pin passes through one of the bushings 37 or 38 of the adjacent inner link unit. A tubular roller 45 is rotatably positioned over each of the bushings 37 and 38.

Each of the rigid side links 35 and 36 of each inner link unit 32 may be fabricated from two straight lengths of wire that are bent near their ends and then are joined by being welded together as at A, B. Similarly each rigid side link of each outer unit 33 is made from two straight lengths of wire that are bent and are then secured together by having the end portions welded to each other as at C, D. The wire may be hot or cold rolled steel wire.

By comparing FIGS. 1 and 2 it will be seen that the chain 34 of the present invention differs from the conventional chain 15 of FIG. 1 in that the side plates of the conventional chain have been replaced by units made of wire, and that the press fit connection of the plates with the transverse bushings and pins have been replaced by welded connections.

FIGS. 3 and 4 illustrates an embodiment of the present invention wherein both the wire inner links 50 and the wire outer links 52 are welded directly to rocker pins 54 and 55, respectively. As seen in FIG. 4, in this type of chain the adjacent rocker pins roll along each other's surfaces.

In FIG. 5, a still further embodiment of the wire link chain of the present invention is illustrated. Inner link units 60 comprise wire side links 61 and 62 that are welded at their ends to the outer periphery of bushings 63. Outer link units 65 include wire side links 66 and 67 each of which is welded at both ends to a relatively short sleeve 68. As seen in FIG. 5, each sleeve 68 fits snugly inside the curved portion of one end of the associated wire link 66 or 67. Each sleeve 68 of side link 66 is connected to a sleeve 68 in a corresponding end of side link 67 by a pin 70 that has its end portions sized for a press fit engagement in the short sleeves.

As shown at the junction of outer link unit 65 with inner unit 60 in FIG. 5, each pin 70 extends freely through one of the bushings 63 of that unit. It will be evident that during the assembly of the chain of FIG. 5, the inner units 60 are completely welded together and then pins 70 of the outer units are inserted through the bushings 63. After the pins are in place, the side links 66 and 67, in which the short sleeves 68 have been welded, are pressed onto the ends of the pins. It will be noted that the outside diameter of each short sleeve 68 is the same as that of the adjacent bushing 63.

As shown at the left end of FIG. 5, in the assembled chain a sprocket-engaging roller 72 is disposed on each bushing 63.

The press fit connections of the outer links to the pins make it relatively easy to detach these links. Accordingly, a chain having such outer link units can be adjusted to change its length by addition or removal of links. To obtain this adjusting feature, it is evident that only one of the outer links 66 and 67 need be press fit on the pins. For example, the sleeves 68 of side link 66 could be welded to the pins 70 while the sleeves 68 of the side link 67 could have a press fit engagement with the pins. Also, the present invention includes a chain construction wherein only a few of the outer links are made detachable according to the teaching of FIG. 5, the remainder of the outer units of the chain having the outer link construction shown in FIG. 2.

From the foregoing description, it will be evident that the present invention provides a chain construction wherein the material waste inherent in the stamped link plates is eliminated. Also, the loop at the end of each wire side link of the present invention has a stress concentration that is much lower than that around the holes at each end of a typical link plate. Accordingly, a chain having the wire links of the present invention has a higher fatigue endurance limit than a chain with link plates that is subjected to the same operating conditions. A feature of the present invention is the fact that during assembly of this chain, the pitch of the chain can be accurately controlled. This is accomplished by urging the chain links to the desired pitch during the welding of the links to the pins and bushings at the time that the metal is in a somewhat plastic state, and holding the pitch dimension during the cooling of the welds. In distinction, if prior art punched link plates are heat treated to relieve stresses around the holes, a change in dimension takes place and the accurate pitch distance between holes is sometimes lost. Accordingly, the use of wire side links welded to pins and bushings makes possible a pitch control that is highly desirable. Since the link side plates of the prior art are relatively thin, some plates have had a tendency to pivot about a vertical axis causing chain malfunction. Wire side links can be designed to have a relatively thick cross-sectional area that resists the tendency to pivot about a vertical axis. Further, when the wire side links of the present invention are welded to the transverse bushings, the bushings are capable of acting as load-carrying members as distinguished from the load-transmitting function of bushings that are loosely connected to side plates.

Although the best mode contemplated for carrying out the present invention has been herein shown and described, it will be apparent that modification and variation may be made without departing from what is regarded to be the subject matter of the invention.

What I claim as new and desire to protect by Letters Patent is:

1. In a power transmission chain of the type in which alternate inner and outer link units are interconnected to form the chain, the improvement wherein at least one of said link units comprises a pair of spaced generally parallel side links formed from bent wire having its end portions welded to each other, and a pair of pins extending transversely between said side links near the opposite ends thereof and secured thereto by filler type welding.

2. A chain according to claim 1 wherein each of said wire side links is an elongated closed loop with a generally semi-cylindrical inwardly facing portion at each end, and wherein each of said pins is disposed in opposed ends of said side links in welded engagement with said inwardly facing portion.

3. A chain according to claim 1 wherein said wire side links are made of steel.

4. A power transmission chain of the type wherein a plurality of alternate inner and outer link units are connected end to end to form an endless chain, the improvement wherein each of said inner links comprises a pair of spaced tubular bushings disposed in generally parallel relation and a pair of side links welded to corresponding ends of said bushings, each inner side like being formed as a loop of wire having its end portions welded together and having curved internal portions secured to the periphery of said bushings by filler type welding; and each of said outer links comprises a pair of pins disposed in the adjacent bushings of the adjacent inner links, and a pair of side links, each side link being formed as a loop of wire having its end portions welded to each other and having curved internal surfaces secured to said pins by filler type welding, each loop being welded to the ends of pins on the same side of the chain; and a hollow cylindrical roller disposed over each of said bushings.

5. A power transmission chain of the type in which alternate inner and outer link units are connected end to end to form the chain, the improvement wherein each of said link units comprises a pair of spaced generally parallel side links formed from bent wire having its end portions welded to each other, and transverse pins extending between said side link units secured thereto by filler type welding, and wherein one pin of each unit is disposed in rolling contact with a pin of an adjacent unit.

6. A chain of the type wherein inner and outer link units are connected in alternate relation to form the chain, one of said link units comprising a pair of generally parallel transversely spaced side links formed from bent wire having its end portions welded to each other, each side link being formed into an elongated closed loop with generally semicylindrical end portions, a short sleeve secured by filler type welding in the end portions of each of said loops, and a pin extending transversely between opposed ends of said side links and secured in the short sleeves at said ends.

7. A chain according to claim 6 wherein said pins are secured in said sleeves by a press fit engagement.

8. A chain according to claim 6 wherein each link unit connected to each end of said one link unit includes a cylindrical bushing disposed over said pin of said one link unit at that link end portion, said bushing being of substantially the same outer diameter as the short sleeves on said one link unit at said end portion.

9. In a power transmission chain of the type in which alternate inner and outer link units are interconnected to form the chain, the improvement wherein at least one of said link units comprises a pair of spaced generally parallel side links formed from bent wire having its end portions welded to each other, and a pair of hollow cylindrical bushings extending transversely between said side links near opposite opposed ends of said links, said bushings being secured by filler type welding to said wire side links near said opposed ends thereof.

10. A chain according to claim 9 wherein each of said wire side links is an elongated closed loop with a generally semi-cylindrical portion at each end, and wherein each bushing is disposed in the loop at one end of said links and is welded therein.

11. In a power transmission chain of the type in which alternate inner and outer link units are connected end to end to form the chain, the improvement in which each of said inner links comprises a pair of spaced generally parallel cylindrical bushings and a pair of side links formed from bent wire having its end portions welded to each other, each side link being formed as a closed loop having spaced internal surfaces secured by filler type welding to the outer peripheries of one of said bushings at an end portion thereof; each of said outer link units being associated with two adjacent inner link units; each outer link unit comprising a pair of pins one of which extends through the bushing of one of the associated inner units, and side links formed from bent wire having its end portions welded to each other secured by filler type welding to said pins.

* * * * *